United States Patent Office 3,395,911
Patented Aug. 6, 1968

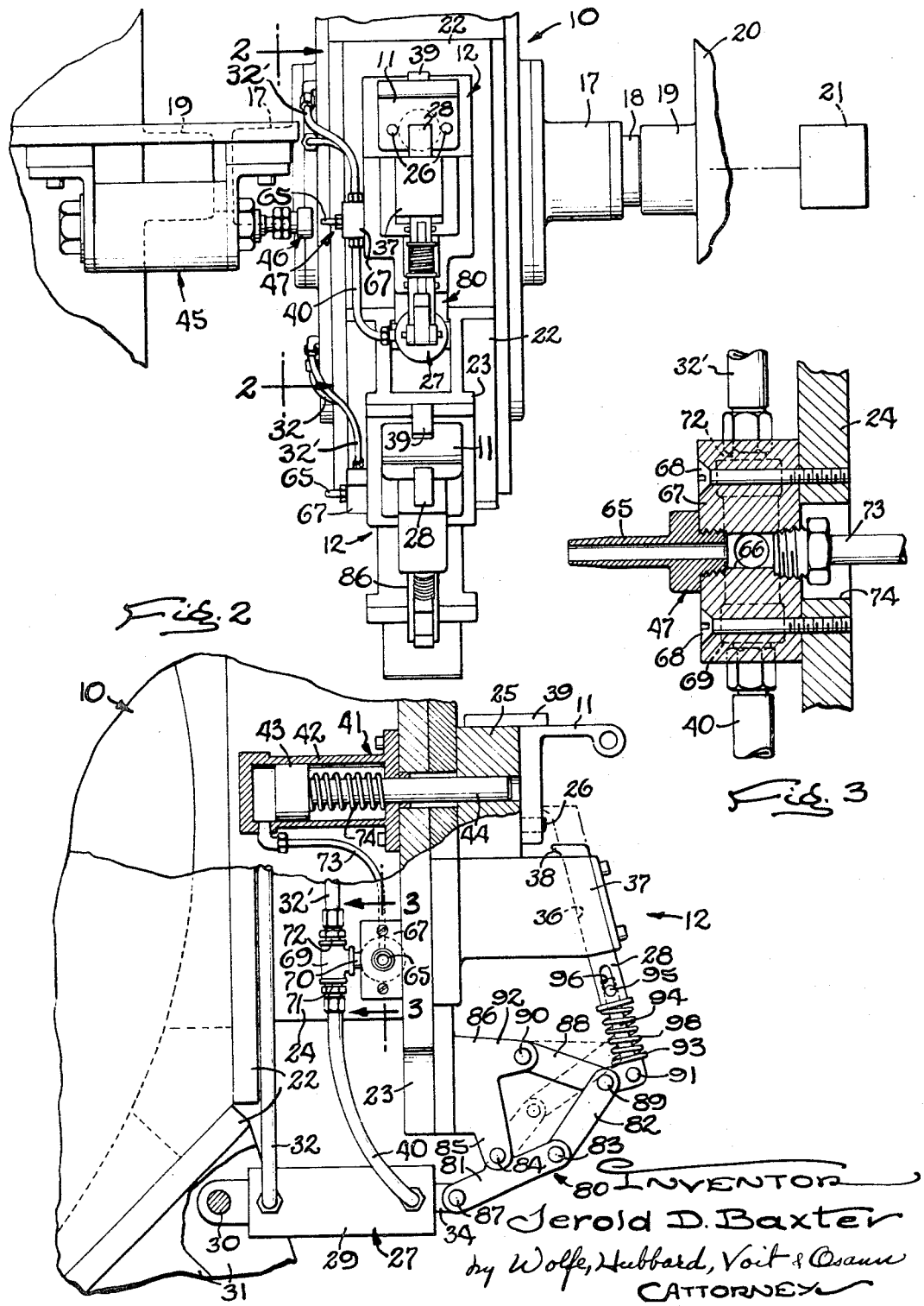

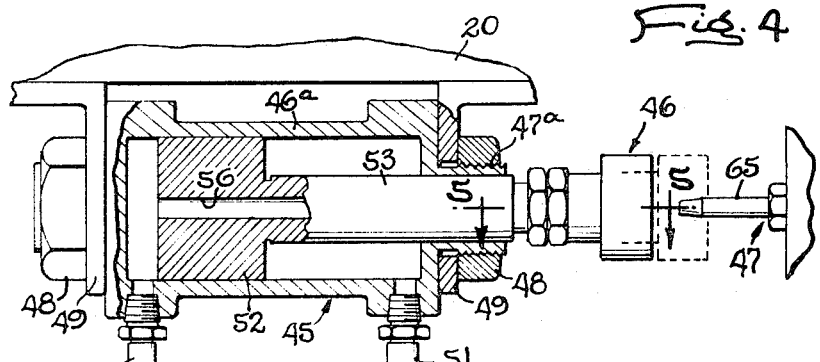
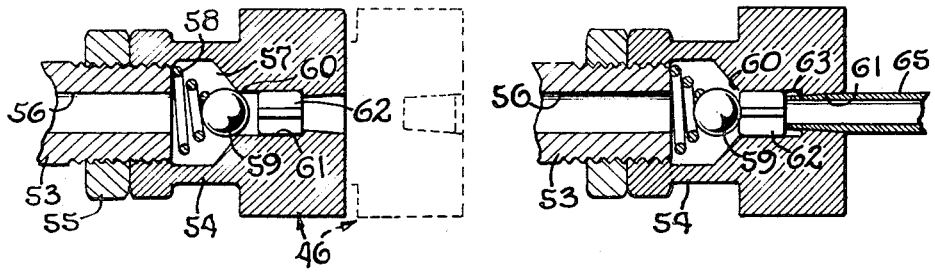
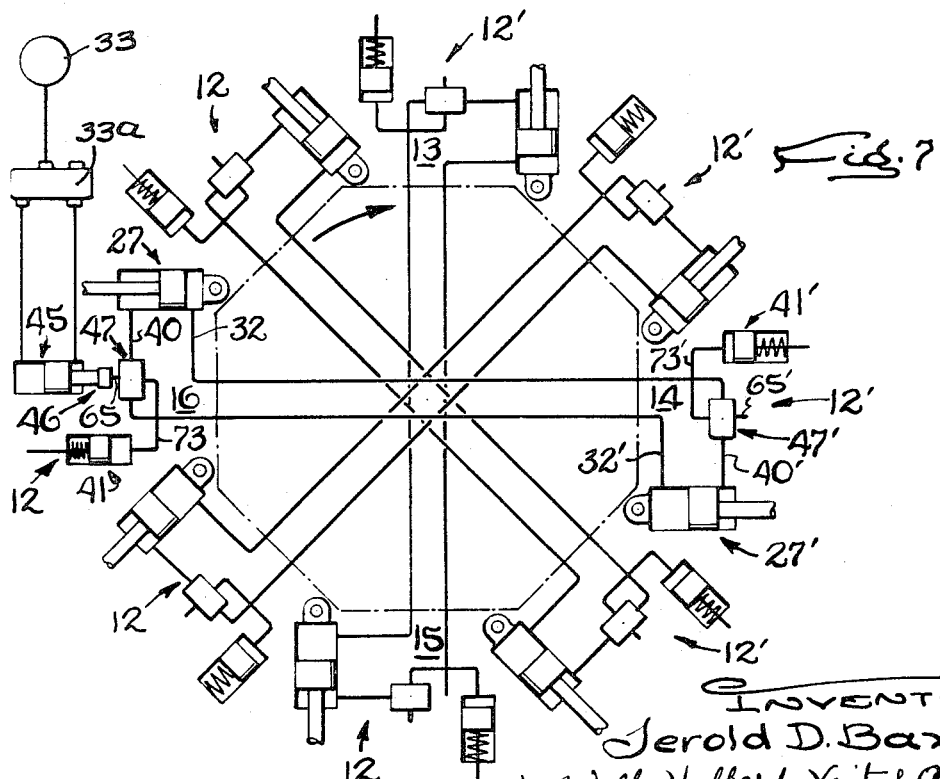

3,395,911
INDEXABLE CLAMPING MACHINE
Jerold D. Baxter, Rockford, Ill., assignor to Atwood
Vacuum Machine Company, Rockford, Ill.
Filed Jan. 11, 1966, Ser. No. 519,909
12 Claims. (Cl. 269—31)

ABSTRACT OF THE DISCLOSURE

Clamping fixtures mounted on a rotatable table are indexed through successively spaced clamping, working and unclamping stations and include fluid-actuated operators which are energized to shift the fixtures into and out of clamping engagement with workpieces as the fixtures dwell in the clamping and unclamping stations. Pressure fluid for energizing the operators is supplied by a fluid injector which momentarily couples up with the operator of each fixture dwelling in the unclamping station to cause unclamping of such fixture and to cause simultaneous clamping of another fixture dwelling in the clamping station.

---

This invention relates to a machine of the type having at least one clamping fixture indexed by a carrier through successively spaced clamping, working and unclamping stations. In general, a fluid operator is energized by a source of pressure fluid to shift the fixture into clamping engagement with a workpiece when the carrier dwells at the clamping station and, after a manufacturing operation has been performed on the clamped piece at the working station, the operator again is energized to shift the fixture oppositely for unclamping the piece as the carrier dwells at the unclamping station.

The general object of the present invention is to simplify the fluid system necessary for energizing the fluid operator in a machine of the above character by moving the fluid pressure source into and out of physical coupling relation with the operator when the carrier dwells.

A more detailed object is to provide a novel fluid injector for coupling and uncoupling the fluid pressure source with the fluid operator.

A further object is to maintain the fixture clamped independently of the fluid pressure source when the latter is uncoupled from the operator.

A more specific object is to utilize the source of pressure fluid for ejecting the workpiece from the fixture as an incident to unclamping the fixture.

Another object is to achieve optimum machine efficiency while still maintaining an uncomplicated fluid system by furnishing the carrier with an additional fixture interconnected with the first fixture, one fixture of the pair being clamped and the other being unclamped each time the pressure source is coupled.

Other objects and advantages of the invention will become apparent from the following detailed description taken in connection with the accompanying drawings, in which:

FIGURE 1 is a fragmentary front elevation of a machine embodying the novel features of the present invention.

FIG. 2 is an enlarged fragmentary cross-section taken substantially along the line 2—2 of FIG. 1, with parts broken away.

FIG. 3 is an enlarged fragmentary cross-section taken substantially along the line 3—3 of FIG. 2.

FIG. 4 is an enlarged fragmentary view of parts shown in FIG. 1.

FIG. 5 is an enlarged fragmentary cross-section taken substantially along the line 5—5 of FIG. 4.

FIG. 6 is a view similar to FIG. 5 showing parts in moved positions.

FIG. 7 is a schematic view and fluid circuit diagram of the machine shown in FIG. 1.

As shown in the drawings for the purpose of illustration, the invention is embodied in an indexing carrier 10 for advancing eight identical clamping fixtures 12 step-by-step through a series of stations successively spaced around the outside of the carrier. As each fixture reaches a loading station 13 (FIG. 7), an unfinished article of manufacture, shown in FIGS. 1 and 2 as a hinge 11, is placed loosely into the fixture and the loaded fixture is indexed by the carrier to a clamping station 14 where the hinge is clamped securely in the fixture. The fixture and the clamped hinge next advance to a working station 15 at which a machining operation such as shaping or drilling is performed on the hinge. Finally, the hinge is unclamped and ejected from the fixture at an unclamping station 16 and the empty fixture returns to the loading station thus completing one cycle of the carrier.

As shown in FIGS. 1, 2 and 7, the indexing carrier 10 is a casting in the form of an octangular table having hubs 17 secured to each side thereof. A horizontal drive shaft 18 which extends through the table is keyed to the hubs and journaled in bearings 19 secured to a stationary frame 20. Intermittent rotational drive is imparted to the table by a conventional indexing mechanism 21 (shown schematically in FIG. 1) coupled to the shaft. In order to stop the clamping fixtures 12 at the various stations for performing the operations described above, the drive mechanism is geared so that the table rotates through one-eighth of a revolution, dwells, rotates through another one-eighth of a revolution, dwells, and so forth for each revolution of the shaft. Since the table is driven in this manner, one clamping fixture is located at each of the four stations and the remaining four fixtures are located intermediate the stations whenever the table dwells.

While the particular clamping fixture utilized may vary depending upon the article clamped, each fixture 12 herein includes a rectangular, inner base plate 22 secured to one of the eight faces of the table and an outer base plate 23 spaced from the plate 22 and connected thereto by spaced apart side walls 24. Rigid with the outer plate is a clamping block 25 formed with a series of spaced pins 26 projecting outwardly from its exposed face. When the clamping fixture is stopped at the loading station 13, the hinge 11, which has holes drilled therethrough in spaced relationship to the pins, is slipped onto the pins and held loosely in the fixture until the latter is indexed to the clamping station 14. At this station, a fluid operator in the form of a two-way ram 27 is energized to shift a clamping arm 28 into clamping engagement with the hinge. The ram includes a cylinder 29 attached by a pin 30 to a pair of webs 31 which extend outwardly from the inner base 22 of the next adjacent clamping fixture. As fluid under pressure flows into the inner side of the cylinder through a conduit 32 communicating with a suitable source of pressure fluid such as an air compressor 33 (shown schematically in FIG. 7), a piston rod 34 within the cylinder extends to shift the arm upwardly through an inclined bore 36 formed in a guiding extension 37 which is welded to the outer plate. This causes a toe 38 at the upper end of the arm to engage the hinge and to wedge the latter into secure clamped engagement between the exposed face of the clamping block 25 and a flange 39 projecting outwardly from the block and overlying a portion of the hinge.

The clamping fixture 12 then is indexed to the working station 15, and, after the hinge 11 is machined as desired, is advanced to the unclamping station 16. Upon reaching this station, compressed air is introduced into the outer side of the cylinder 29 through a conduit 40 and the piston rod 34 is retracted thereby sliding the arm 28 downwardly to the full line position shown in FIG. 2 and unclamping the hinge. The unclamped hinge also is ejected from the fixture as the latter dwells in the unclamping station by an ejector 41 in the form of a fluid ram which includes a cylinder 42 secured at one end to the outer plate 23. Slidable within the cylinder is a piston 43 formed integrally with an elongated plunger 44 projecting through a bore formed in the outer plate and in the clamping block 25. When the piston extends, the plunger engages the hinge to kick it out of the fixture and onto a conveyor (not shown) for transfer to a further manufacturing operation.

In accordance with one aspect of the present invention, the fluid system required for actuating the clamp rams 27 is greatly simplified and the need for an elaborate valve arrangement between the rams and the source of pressure fluid is avoided by physically coupling the source to the clamp rams only when the carrier 10 dwells. For this purpose, the pressure source is normally stationary with respect to the carrier and, when any given clamping fixture reaches a stop position such as the unclamping station 16, a fluid injector 45 communicating with the pressure source advances toward the carrier. Mounted on the advancing fluid injector is a quick-connect coupler 46 which automatically telescopes with a complementary coupler 47 associated with the ram of the fixture in the station to establish momentary fluid communication between the pressure source and the ram. Upon such establishment, fluid under pressure is injected into the ram by way of the injector and the energized ram shifts the clamping arm 28 downwardly to unclamp the hinge. The fluid injector then retracts from the carrier thereby severing the connection between the couplers so that the carrier may index the fixture to the next station unencumbered by fluid lines.

In this instance, the fluid injector 45 is a two-way ram (FIG. 4) and includes an enclosed cylinder 46a formed with threaded end portions 47a which are secured by nuts 48 to spaced brackets 49 bolted to the stationary frame 20. A pair of fluid lines 50 and 51 are connected to each end of the cylinder and extend to a conventional four-way valve 33a interposed in the fluid system between the compressor 33 and the injector for controlling the latter. Slidable within the cylinder is a piston 52 integral with an elongated rod 53 which projects from the end of the cylinder toward the table 10.

As shown in FIGS. 4-6, the coupler 46 is in the form of a tubular sleeve having an integral collar 54 threaded on the outer end of the rod 53 into abutting relationship with a stop nut 55, the latter also being threaded on the rod. An elongated bore 56 extends through both the piston 52 and the rod 53. The bore communicates at one end with the fluid line 50 and at the opposite end with a cylindrical chamber 57 formed in the coupler. Housed within the chamber is a coil spring 58 which bears against the outer end of the rod and urges a ball-type check valve 59 against a tapered seat 60 to seal a counterbored passage 61 extending from the chamber to the free end of the coupler. A valve operator 62 having a fluted exterior surface is slidable within the passage and is retained therein by an annular shoulder 63 formed by the counterbore.

When each clamping fixture 12 dwells at the unclamping station 16, compressed air is introduced into the cylinder 46 through the line 50 thereby extending the rod 53 and the coupler 46. After moving only a short distance, the coupler automatically telescopes onto a hollow male stem 65 of the coupler 47, as shown in broken lines in FIGS. 4 and 5. The stem 65 projects toward the coupler 46 and is threaded in a bore 66 extending through a block 67 which is secured by screws 68 to the side wall 24 of the fixture. Also secured to the side wall is a T-fitting 69 having one nipple 70 communicating with the bore in the block and having another nipple 71 connected to the conduit 40 leading to the clamp ram 27 (FIGS. 2 and 3). Accordingly, as the coupler 46 advances toward the stem, the latter slides into the passages 61 and forces the valve operator 62 (FIG. 6) against the ball valve thereby opening the passage and permitting air under pressure to flow from the cylinder 46a, through the rod 53, past the fluted surface of the valve operator and into the hollow stem. The air flows from the stem into the T-fitting 69 and finally into the conduit 40 to retract the piston rod 34 of the clamp ram 27 thereby shifting the arm 28 downwardly and unclamping the hinge 11. After the hinge is unclamped and ejected, air is introduced into the cylinder 46a through the fluid line 51 to retract the injector piston 52 and thus sever the connection between the couplers 46 and 47. The fixture 12 then is indexed to the loading station 13, and another cycle is begun.

Advantage is taken of the foregoing arrangement to provide for ejection of the hinge 11 as an incident to the fluid injector coupler 46 engaging the fixture coupler 47. Herein, a conduit or hose 73 (FIGS. 2, 3 and 7) is threaded into the bore 66 in the block 67 of the coupler 47 and extends through a hole 74 in the side wall 24 to the inner side of the ejector cylinder 42. The hose 73 is of smaller internal diameter than the conduits 40 and 32. When compressed air is introduced into the coupler 47 at the unclamping station 16, the clamp ram 27 is impulsed to unclamp the hinge and the ejector 41 is impulsed slightly later due to the difference in the hose sizes. Accordingly, the plunger 44 does not extend to eject the hinge until the latter is unclamped. After the hinge is ejected and the couplers 46 and 47 are disconnected, a coil spring 74 telescoped over the plunger 44 and compressed between the ejector cylinder 42 and the piston 43 retracts the plunger back within the clamping block 25.

The present invention also contemplates interconnecting the clamping fixtures in pairs with one fixture of each pair dwelling at the clamping station 14 when the other fixture of the pair is in the unclamping station 16 so that both clamping and unclamping of the respective fixtures is accomplished during a single dwell of the carrier 10 and upon a single advancement of the injector 45. To this end, the coupler 47 of each fixture not only communicates with the clamp ram 27 associated directly with that fixture, but also communicates with the ram of the other fixture of the pair, the fluid conduits being connected in such a manner that one ram is retracted and its mate is extended each time air is injected into the coupler by the fluid injector.

As shown in FIG. 7, a representative clamping fixture 12 is located in the unclamping station 16 while the other fixture 12' of the pair is disposed on the table 10 diametrically opposite to the fixture 12 and is located in the clamping station 14. The clamping fixtures are identical in all respects with the parts of the fixture in the clamping station being indicated by the same but primed reference numerals. Herein, the conduit 40 connected to the outer side of the ram 27 leads directly to the coupler 47 while the conduit 32 connected to the inner side of the ram 27 extends across the table to a coupler 47' of the fixture 12' and is connected to the T-fitting of that coupler. Similarly, a conduit 40' is connected to the outer side of a ram 27' associated with the fixture 12' and leads directly to the coupler 47' while a conduit 32' is connected to the inner side of the ram 27' and extends across the table to the coupler 47, the conduit 32' being connected to the nipple 72 of the latter coupler (FIG. 3).

Accordingly, when the fluid injector 45 advances the coupler 46 into engagement with the stem 65 of the coupler 47, air flows through the conduit 40 to retract the ram 27 thereby unclamping the hinge 11 in the clamping fixture 12 and simultaneously flows through the conduit 32' into the inner side of the ram 27' to extend the latter and thereby clamp the hinge in the fixture 12' located in the clamping station 14. As the ram 27 is retracted, the air in its inner side is exhausted into the atmosphere through the conduit 32 and the exposed stem 65' of the coupler 47'.

It should be realized, of course, that the coupler 46 on the fluid injector 45 engages the coupler 47' of the clamping fixture 12' when the latter is indexed to and dwells at the unclamping station 16 thereby unclamping the hinge associated with the fixture 12' and clamping the hinge loaded into fixture 12, the latter fixture now being located at the clamping station 14. The fluid conduits of the remaining pairs of fixtures are arranged similar to the conduits of the pair described above with the fluid system of each pair of fixtures being independent of every other pair. With this arrangement, it is apparent that one fixture is clamped and one fixture is unclamped each time the table dwells and each time the fluid injector advances and yet the fluid system on the carrier is extremely simple and relatively inexpensive since valves are not required within the system itself. If desired, the fluid conduit connections to the clamp rams may be reversed so that the ram 27 is extended and the ram 27' is retracted when the coupler 46 engages the coupler 47.

As shown in FIG. 2, means are provided for holding each clamping arm 28 in its clamped or unclamped position after the couplers 46 and 47 disengage and after the charge of air in the clamp ram 27 exhausts through the stems 65 and 65'. In this instance, these means comprise a toggle 80 connected between the arm and the piston rod 34 for swinging overcenter in opposite directions as the piston is extended and retracted to retain the arm in its shifted position in spite of the absence of fluid pressure in the ram.

Herein, the toggle 80 includes a knee formed by a pair of links 81 and 82 pivotally interconnected in end to end relationship by a pin 83 extending through the links. The link 81 is fulcrumed at its mid-point by a pin 84 to an upright arm 85 of a projection 86 rigid with the outer plate 23 and is pivoted at its inner end to the piston rod 34 by a pin 87. The link 80 is pivoted intermediate the ends of a third or swing link 88 by a pin 89 with the latter link in turn being pivotally connected by pins 90 and 91 respectively to a horizontal arm 92 of the projection 86 and to a yoke 93 on the lower end of the clamping arm 28. When the piston 34 extends, the link 81 pivots counterclockwise (FIG. 2) about the pin 84 and forces the links 82 and 88 and the clamping arm 28 upwardly. The upward movement of these elements is governed, however, by the swing link 88 which restricts the pin 89 to movement in an arcuate path about the pin 90. Accordingly, the knee of the toggle (defined by the pin 83) swings across a straight line extending between pins 84 and 89 to the final shifted position shown in broken lines in FIG. 2. Since the toggle has swung overcenter, the clamping arm 28 is held in its clamped position and application of positive force to the toggle is required to swing the knee back overcenter to the full line, unclamped position of FIG. 2.

In some instances, dimensional irregularities in the hinge 11 may increase the thickness thereof to such an extent that the toe 38 of the clamping arm 28 engages the hinge before the clamping arm has moved upwardly a sufficient distance to permit the toggle 80 to swing overcenter. This difficulty may be avoided, however, by utilizing a lost-motion connection between the clamping arm and the swing link 88. Herein, the yoke 93, to which the link 88 is connected, is formed integrally with an elongated rod 94 which telescopes into the lower end of the clamping arm. A pin 95 extends transversely through the rod and slides upwardly and downwardly in a slot 96 cut in the clamping arm. Compressed between the yoke and the clamping arm is a coil spring 98 which surrounds the rod 94 and urges the latter downwardly as shown in FIG. 2. Accordingly, when the ram 34 is extended, the rod 94, the spring 98 and the clamping arm 28 shift upwardly as a unit until the toe 38 of the clamping arm wedges against the hinge thereby stopping the arm. If at this time the arm has not shifted far enough to permit the toggle 80 to swing overcenter, the rod 94 slides upwardly within the arm against the force of the spring and the toggle continues to move to the broken line, overcenter position. Thereafter, the spring 98 urges the yoke 93 downwardly and aids in retaining the toggle overcenter.

From the foregoing, it is apparent that the new and improved machine described above accommodates a large number of clamping fixtures and yet is of relatively simple and inexpensive construction. Moreover, since the fluid system of each pair of clamping fixtures 12 and 12' is independent of each of the other pairs, any given pair of fixtures can be removed from the carrier 10 for repair or replacement purposes without rendering the entire machine unusable thereby resulting in a considerable saving in shut-down time.

I claim as my invention:

1. In a machine having clamping, working and unclamping stations spaced successively in a predetermined path, the combination of, an indexing carrier mounted to be advanced step-by-step along the path, a clamping fixture for receiving a workpiece mounted on said carrier to move sequentially into said stations, a fluid actuated operator connected to said clamping fixture for shifting the latter relative to said workpiece, a first coupler on said carrier adjacent said path and communicating with said fluid operator, a fluid pressure source for charging said operator, a second coupler disposed alongside said path and adapted to communicate with said fluid pressure source and normally disengaged from said first coupler, means operable in timed relation with the advance of said carrier to move said couplers into physical engagement and into fluid communication when said clamping fixture dwells in one of said stations whereby a fluid charge is impressed upon said operator to shift the position of said clamping fixture relative to the workpiece, said means moving said couplers out of engagement before said clamping fixture advances toward the next adjacent station, and mechanism mounted on said carrier and acting on said clamping fixture to hold the latter in its shifted position when the fixture is in said adjacent station and said couplers are disengaged.

2. The combination as defined in claim 1 in which said fluid pressure source and said second coupler are mounted on a frame which is stationary with respect to said carrier.

3. The combination as defined in claim 1 in which said moving means comprises a fluid injector adapted to communicate with said fluid pressure source and connected to said second coupler.

4. The combination as defined in claim 3 in which said fluid injector comprises a cylinder adapted to communicate with said source, a piston slidable back and forth in said cylinder, said piston having a bore therethrough communicating with said cylinder and with said second coupler, and means connecting the latter to said piston whereby said second coupler moves toward and away from said first coupler when said piston is slid back and forth.

5. The combination as defined in claim 1 in which said second coupler comprises a tubular body having a check valve therein urged normally to a sealing position thereby preventing escape of pressure fluid from said body, and said first coupler comprises a hollow, projecting stem telescoped into said tubular body when said couplers are engaged and forcing said valve out of said sealing position to establish fluid communication between said source and said operator.

6. The combination as defined in claim 1 further including a second clamping fixture disposed on said carrier and positioned in said unclamping station when said first fixture is in said clamping station, and a second fluid actuated operator connected to said second fixture and communicating with said first coupler.

7. The combination as defined in claim 1 further including a fluid ram connected to said clamping fixture and communicating with said first coupler for ejecting said workpiece when said fixture is in said unclamping station.

8. The combination as defined in claim 7 in which a conduit connects said fluid actuated operator with said first coupler and a conduit of smaller internal diameter connects said ejector ram with said first coupler.

9. A machine as defined in claim 1 in which said fixture comprises a clamping face adapted to engage a workpiece, a clamping arm shiftable between gripping and releasing positions with respect to said clamping face, and said mechanism comprising a toggle disposed between said fluid operator and said clamping arm and responsive to said fluid charge to shift said clamping arm from said releasing position to said gripping position, and means connected between said clamping arm and said toggle for swinging the latter overcenter as said clamping arm is shifted to said gripping position whereby the toggle securely retains said arm in the latter position after the fluid charge has dissipated.

10. A device as defined in claim 9 including lost-motion means connected between said swinging means and said clamping arm, and a spring yieldably resisting movement of said lost-motion means and effective to yieldably retain said toggle overcenter.

11. In a machine tool, the combination of, an indexing carrier advanceable step-by-step along a predetermined path with dwells between successive steps, first and second clamping members mounted for advancement with said carrier and shiftable between gripping and releasing positions, first and second fluid-actuated cylinders respectively connected to said first and second clamping members for shifting the latter to said gripping and releasing positions, first and second couplers respectively disposed adjacent said first and second clamping members with each of said couplers communicating with each of said cylinders, said first coupler communicating with one end of said first cylinder and the opposite end of said second cylinder, said second coupler communicating with the opposite end of said first cylinder and the one end of said second cylinder, a source of pressure fluid, and means communicating with said source and movable relative to said carrier for engaging one of said couplers during one dwell of said carrier and for engaging the other of said couplers during another dwell of said carrier and charging each of said cylinders with fluid upon each such engagement thereby to shift one of said clamping members to said gripping position and the other of said clamping members to said releasing position.

12. A machine tool as defined in claim 11 in which fluid is introduced from said source into said first coupler as the latter is engaged with said movable means and then is exhausted from said first coupler as said second fluid coupler is engaged with said movable means.

References Cited

UNITED STATES PATENTS

| | | | |
|---|---|---|---|
| 2,493,206 | 1/1950 | Okey | 51—134 |
| 2,777,347 | 1/1957 | Sendoykas | 269—94 X |
| 2,829,566 | 4/1958 | Gecks | 269—20 X |
| 3,027,155 | 3/1962 | Patterson | 269—32 |

FOREIGN PATENTS 208,234  5/1957  Australia.

ROBERT C. RIORDON, *Primary Examiner.*

D. R. MELTON, *Assistant Examiner.*